United States Patent [19]

Capps

[11] Patent Number: 5,086,483
[45] Date of Patent: Feb. 4, 1992

[54] OPTICAL PROCESSOR INCLUDING ELECTRONIC PROCESSING ARRAY

[75] Inventor: C. David Capps, Seattle, Wash.
[73] Assignee: The Boeing Company, Seattle, Wash.
[21] Appl. No.: 402,121
[22] Filed: Aug. 31, 1989
[51] Int. Cl.$^5$ .............................................. G06K 9/00
[52] U.S. Cl. .................... 382/31; 250/208.1; 382/42; 382/68; 359/560
[58] Field of Search ................ 382/31, 68, 42, 65; 350/162.13, 162.14, 162.12; 250/208.1, 208.2, 208.6

[56] References Cited

U.S. PATENT DOCUMENTS

| | | | |
|---|---|---|---|
| 3,666,359 | 5/1972 | Lee | 350/162.13 |
| 3,785,736 | 1/1974 | Spitz et al. | 350/162.13 |
| 3,925,658 | 12/1975 | Connors | 250/208.2 |
| 4,227,805 | 10/1980 | Schiller | 382/31 |
| 4,837,843 | 6/1989 | Owechko | 382/31 |

Primary Examiner—Leo H. Boudreau
Attorney, Agent, or Firm—Christensen, O'Connor, Johnson & Kindness

[57] ABSTRACT

A hybrid optical/electronic processor for determining the presence of a feature of interest in an input image. The system includes an optical processor for convolving the input image with a target image representing the feature of interest, to produce an output image that is incident onto an electronic processing array. The array comprises a two dimensional array of processing cells, each of which performs local operations. In particular, each processing cell comprises a a photodetector for producing an electronic detection signal corresponding to the intensity of illumination at the processing cell, means for transmitting the detection signal to adjacent processing cells, and means for receiving detection signals from adjacent processing cells. Each processing cell produces an output signal if the local and neighboring detection signals satisfy a predetermined criteria. The output signal preferably comprises the address of the processing cell.

18 Claims, 2 Drawing Sheets

OPTICAL PROCESSOR INCLUDING ELECTRONIC PROCESSING ARRAY

FIELD OF THE INVENTION

The present invention relates to optical processors and, in particular, to an optical processor for determining the presence of a feature of interest in an image.

BACKGROUND OF THE INVENTION

Optical correlators and other optical processors using holographic elements to effect geometric transforms have been known for over twenty years. The earliest devices used film for input and output and, hence, did not operate in realtime. However, recent advances in spatial light modulator technology now allow images to be input to optical processors at video frame rates.

An optical correlator uses the Fourier transform property of lenses to convolve an input image with a target image to produce an output image. If the target image appears at a given position in the input image, then the output image contains a peak at that position. A Hough transform processor operates in an analogous manner to produce a peak corresponding to the occurrence of lines in the input image. Current practice is to detect and read out the output image using a CCD or CID detector array, digitize the values of each pixel, and then search the image in a serial manner using a computer. However, it is well known that electronic computers have difficulty interpreting images at video rates. The electronic computer thus becomes a processing bottleneck, reducing the overall data processing rate of the system. There is therefore a need for a technique for accelerating the speed of the electronic processing components of optical correlators.

SUMMARY OF THE INVENTION

The present invention provides a hybrid optical/electronic processor for determining the presence of a feature of interest in an input image. In a preferred embodiment, the system comprises an optical processor and an electronic processing array. The optical processor convolves the input image with a target image representing the feature of interest, to produce an output image. The electronic processing array comprises a two-dimensional array of processing cells, and operates to determine the presence of a convolution peak in the output image. Each processing cell comprises a photodetector for producing an electronic detection signal corresponding to the intensity of illumination at the processing cell. Each processing cell further comprises means for transmitting the detection signal to one or more adjacent processing cells, and means for receiving detecting signals produced by one or more adjacent processing cells. Finally, each processing cell comprises detection means for producing an output signal if the detection signals satisfy a predetermined criteria. The output signal preferably encodes the address of the processing cell in the electronic processing array.

The basic concept of the present invention is that the optical processor performs global operations, such as Fourier transformation and matched filtering, to reduce the information content to an image that can be interpreted using local operations, such as peak detection. The electronic processing array will detect this image, perform the necessary local operations, and transmit the address of the feature of interest from the array to a further processing stages. This address can then be used to get complete information for the detected location from an image frame store, or to direct another sensor to the appropriate location. The advantage of this hybrid optical/electronic approach is that optics, which is massively parallel, can be used for the global operations, and electronics, which is optimal for flexible decision making, can be used for the local interpretation operations.

DETAILED DESCRIPTION OF THE INVENTION

Figure 1:
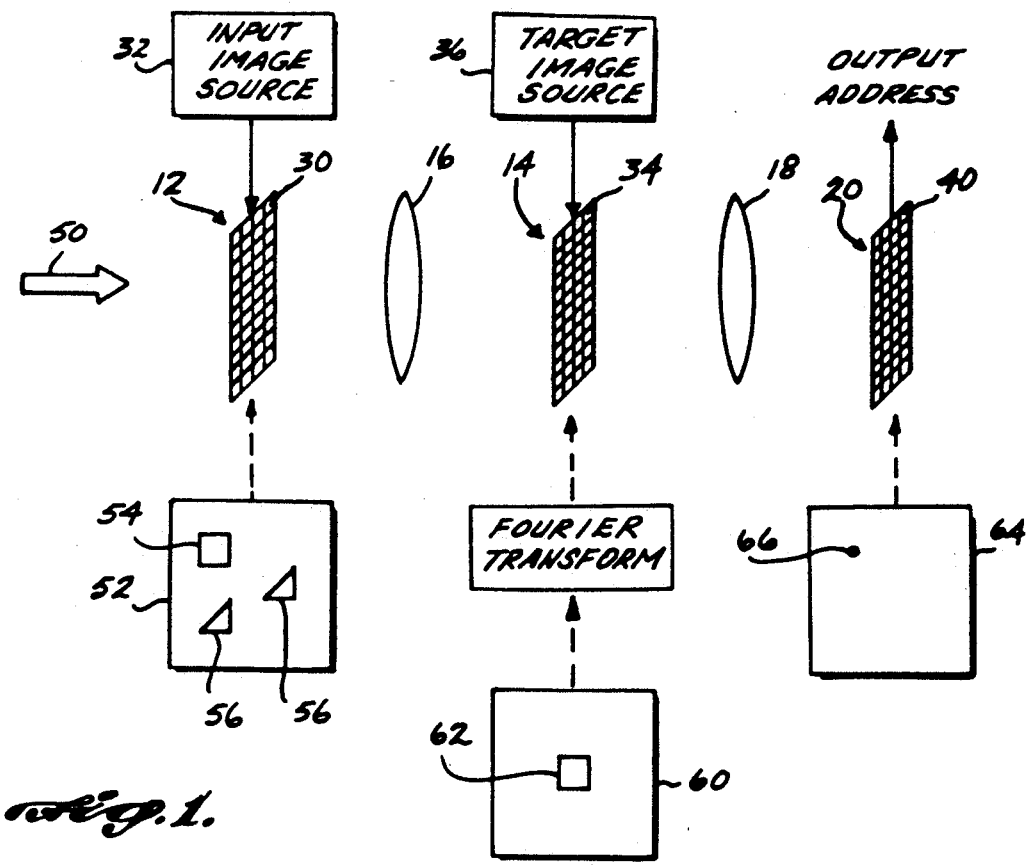
FIG. 1 is an overall diagram of the processor of the present invention.

FIG. 1 illustrates an optical correlator constructed according to the present invention. The correlator includes an input spatial light modulator (SLM) 12, a target SLM 14, Fourier transform lenses 16 and 18, and electronic processing array 20. Input SLM 12 comprises a rectangular array of pixels 30, the optical transmissivity of the pixels being controlled by input image source 32. Target SLM 14 similarly contains a rectangular array of pixels 34, the transmissivity of pixels 34 being controlled by target image source 36. Electronic processing array 20 comprises an array of processing cells 40, as further described below.

Input SLM 12, target SLM 14, and lenses 16 and 18 comprise a known type of optical processor sometimes referred to as a Vanderlugt optical processor. In operation, input SLM 12 is illuminated by coherent, collimated light beam 50, and the input SLM thereby encodes the input image on the light beam. For the sake of illustration, assume that input image 52 includes a square pattern 54 in the upper left portion of the image, and a pair of triangular patterns 56. Fourier transform lens 16 has a focal length $f_1$, and is spaced by distance $f_1$ from image SLM 12 and target SLM 14. Lens 16 thereby forms the two dimensional spatial Fourier transform of the input image on target SLM 14.

Continuing the above illustration, assume that it is desired to determine whether the input image contains a square pattern, and the position of such pattern in the input image. Target image source 36 thereby forms an image 60 that includes the target pattern 62 at the center of the image, and then computes the two-dimensional Fourier transform of target image 60. The transformed target image is then used to control the transmissivity of pixels 34 of target SLM 14, such that bright spots in the transformed target image cause the target SLM to transmit at the corresponding pixel positions.

Fourier transform lens 18 has a focal length $f_2$, and is spaced by distance $f_2$ from target SLM 14 and from electronic processing array 20. Fourier transform lens 18 thereby performs an second Fourier transform, resulting in the production of output image 64 on the electronic processing array. Output image 64 will contain a narrow peak 66 at a position that corresponds to the position of square pattern 54 in the input image.

Figure 2:
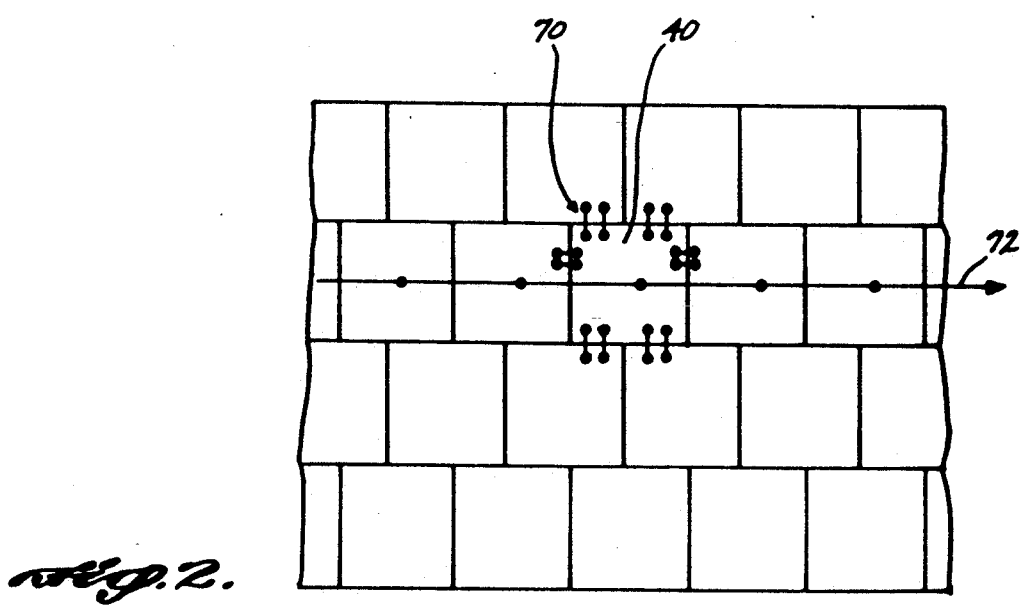
FIG. 2 illustrates a portion of the electronic processing array.
Figure 3:
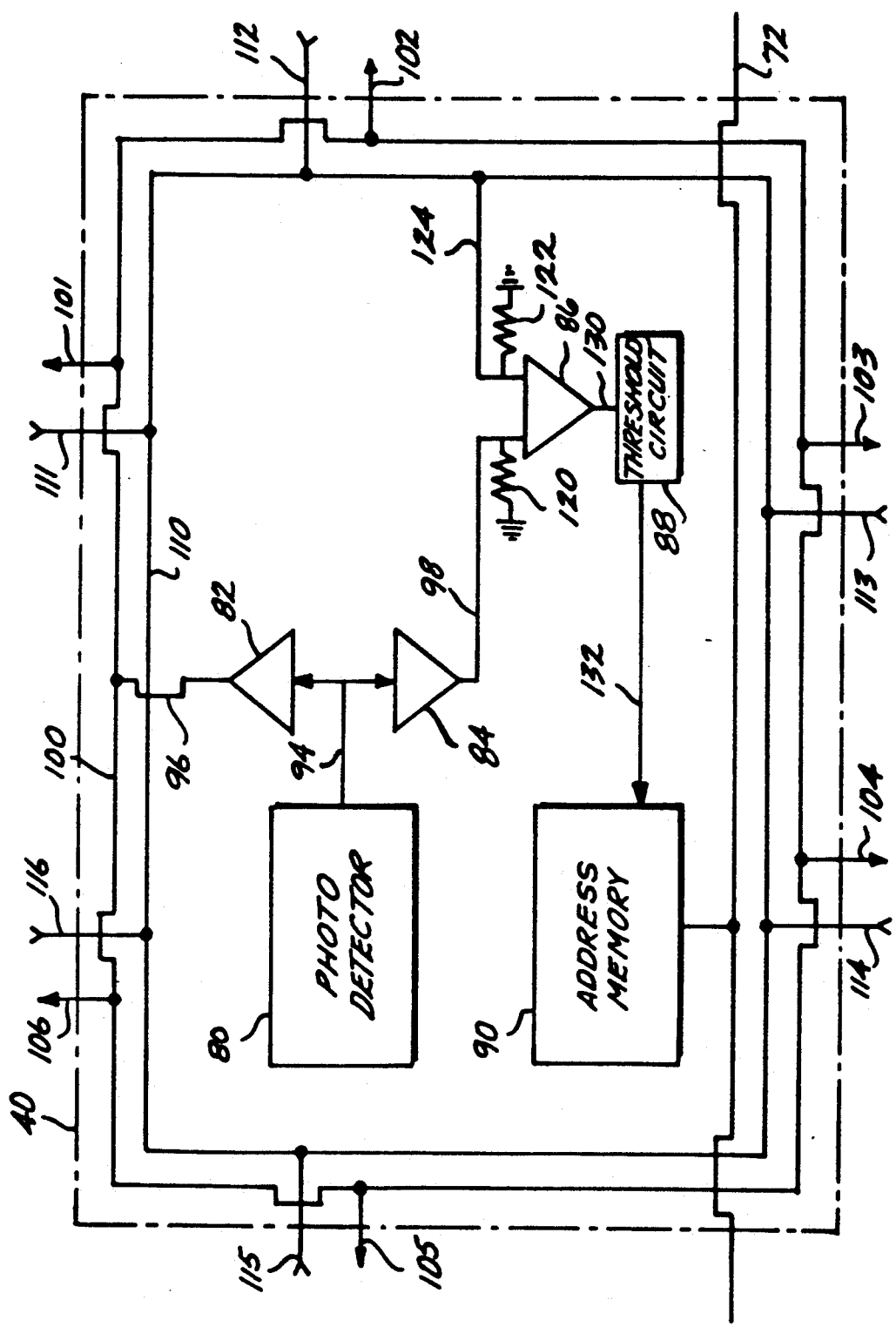
FIG. 3 is a block diagram of one processing cell.

Electronic processing array 20 is illustrated in further detail in FIGS. 2 and 3. Referring initially to FIG. 2, electronic processing array comprises an array of processing cells 40 arranged in a suitable pattern. The pattern shown in FIG. 2 is hexagonal, such that each processing cell 40 has six nearest neighbors. A checkerboard pattern or other suitable patterns could also be used. Each processing cell 40 contains a photodetector for detecting the intensity of light falling on the cell, and for converting such light into a corresponding analog electrical detection signal. Each processing cell 40 is connected by a pair of leads 70 to each of its nearest neighbors, and uses one of each pair of leads to transmit its detection signal to each nearest neighbor. Therefore each cell has access to detection signals representing the light at that processing cell, an at six neighboring processing cells. Analog processing circuitry within each cell receives these detection signals, and implements a predetermined algorithm to determine whether a feature of interest has been detected at that cell. If so, then the cell places its relative address in the processing array onto output line 72.

FIG. 3 provides further details of the construction of a processing cell that implements a peak detection algorithm. Processing cell 40 shown in FIG. 3 includes photodetector 80, current amplifiers 82 and 84, difference amplifier 86, threshold circuit 88, and address memory 90. Photodetector 80 produces an electronic signal on line 94 corresponding to the intensity of light falling on processing cell 40. This current signal is amplified by current amplifiers 82 and 84, to produce amplified detection signals on lines 96 and 98, respectively. The current on line 96 is divided into six equal parts by bus 100, and such parts are then transmitted to the six neighboring processing cells by lines 101-106. Detection signals produced and generated in a similar manner by the six neighboring processing cells are received onto bus 110 via lines 111-116.

The local detection signal 98 is converted to a voltage by resistor 120, and the resulting voltage forms one input to difference amplifier 86. The sum of the six detection signals from neighboring cells are applied to resistor 122 via line 124, producing a voltage that forms the other output to difference amplifier 86. The result is an analog signal on output line 130 representing the difference between the local detection signal and the sum of the neighboring detection signals. In order to scale the signals to one another, current amplifier 82 should produce six times as much current on line 96 as does current amplifier 84 on line 98.

Threshold circuit 88 determines whether the difference between the local and neighboring detection signals exceeds a predetermined threshold. If so, then the threshold circuit sends a signal to digital logic address memory 90 via line 132, causing the address memory to output the address of the processing cell onto digital output line 72. Thus referring back to FIG. 1, the output of the system is the address of peak 66 in output image 64, i.e., the location of feature of interest 54 in input image 52.

Digital output line 72 preferably operates in an asynchronous mode. For example, when a peak is detected, address memory 90 of a given processing cell will attempt to write its stored address onto output line 72. However, if the address memory determines that the output line is busy, it waits a predetermined length of time, and then again attempts to transmit its address to the output line. Such an arrangement avoids time-consuming operations such as polling of each processing cell to determine if a peak has been detected.

The present invention can be utilized with a number of known techniques for pattern recognition, image interpretation or image understanding. For example, to find a given feature in an input image, target image source 36 could cycle through a given shape 62 in a range of sizes and orientations. In an image interpretation application, target image source 36 could break down the sought after image into a number of primitive shapes, and then cycle through each primitive shape in a range of sizes and orientations. Suitable output processing means would then be provided to combine the detected features, in order to determine if a given object appears in the image.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A system for determining the presence of a feature of interest in an input image, the system comprising:
   an optical processor for convolving the input image with a target image representing the feature of interest, to produce an output image;
   an electrical processing array for determining the presence of a convolution peak in the output image, the electronic processing array comprising a two dimensional array of processing cells, each processing cell comprising:
   a photodetector for producing an electronic detection signal corresponding to the intensity of illumination at the processing cell;
   means for transmitting the detection signal to one or more adjacent processing cells;
   means for receiving detection signals produced by one or more adjacent processing cells; and
   detection means separate from the photodetector for producing an output signal if the detection signals satisfy a predetermined criteria.

2. The system of claim 1, wherein each processing cell has an address in the electronic processing array, and wherein the output signal encodes said address.

3. The system of claim 1, wherein each processing cell receives detection signals from four or more adjacent processing cells.

4. The system of claim 3, wherein each processing cell receives detection signals from six adjacent processing cells.

5. The system of claim 1, wherein the detection means comprises comparison means and output means, the comparison means further comprising combining means for combining the detection signals received from the adjacent processing cells to produce a composite signal, and means for producing the output signal if and only if the detection signal produced by the processing cell exceeds the composite signal.

6. The system of claim 5, wherein the combining means sums the detection signals received from the adjacent processing cells to produce the composite signals.

7. The system of claim 1, wherein the means for transmitting comprises a first amplifier for amplifying the electronic detection signal to produce a transmitted detection signal and means for transmitting the transmitted detection signal to the adjacent processing cells, wherein the detection means comprises a second amplifier for amplifying the detection signal to produce a local detection signal, means for summing the transmitted detection signals transmitted from the adjacent processing cells to produce a composite signal, means for comparing the local detection signal to the composite signal, and means for producing the output signal if the local detection signal exceeds the composite signal.

8. The system of claim 7, wherein each processing cell receives detection signals from N adjacent processing cells, and wherein the first and second amplifiers are scaled such that for a given detection signal, the magnitude of the transmitted detection signal is N times larger than the magnitude of the local detection signal.

9. The system of claim 8, wherein N is equal to six.

10. A system for electronically processing an output image formed by convolving an input image with a target image representing a feature of interest to determine the presence of the feature of interest in the input image, the system comprising a two-dimensional array of processing cells, each processing cell comprising:
 a photodetector for producing an electronic detection signal corresponding to the intensity of illumination at the processing cell;
 means for transmitting the detection signal to one or more adjacent processing cells;
 means for receiving detection signals produced by one or more adjacent processing cells; and
 detection means separate from the photodetector for producing an output signal if the detection signal satisfies a predetermined criteria.

11. The system of claim 10, wherein each processing cell has an address in the electronic processing array, and wherein the output signal encodes said address.

12. The system of claim 10, wherein each processing cell receives detection signals from four or more adjacent processing cells.

13. The system of claim 12, wherein each processing cell receives detection signals from six adjacent processing cells.

14. The system of claim 10, wherein the detection means comprises comparison means and output means, the comparison means further comprising combining means for combining the detection signals received from the adjacent processing cells to produce a composite signal, and means for producing the output signal if and only if the detection signal produced by the processing cell exceeds the composite signal.

15. The system of claim 14, wherein the combining means sums the detection signals received from the adjacent processing cells to produce the composite signal.

16. The system of claim 10, wherein the means for transmitting comprises a first amplifier for amplifying the electronic detection signal to produce a transmitted detection signal and means for transmitting the transmitted detection signal to the adjacent processing cells, wherein the detection means comprises a second amplifier for amplifying the detection signal to produce a local detection signal, means for summing the transmitted detection signals transmitted from the adjacent processing cells to produce a composite signal, means for comparing the local detection signal to the composite signal, and means for producing the output signal if the local detection signal exceeds the composite signal.

17. The system of claim 16, wherein each processing cell receives detection signals from N adjacent processing cells, and wherein the first and second amplifiers are scaled such that for a given detection signal, the magnitude of the transmitted detection signal is N times larger than the magnitude of the local detection signal.

18. The system of claim 17, wherein N is equal to six.

* * * * *